US008038328B2

(12) United States Patent
Lin et al.

(10) Patent No.: US 8,038,328 B2
(45) Date of Patent: Oct. 18, 2011

(54) LIGHT-EMITTING DEVICE PRESSURE RING STRUCTURE

(75) Inventors: Hsuan-Chih Lin, Taipei County (TW); Hong-Long Chen, Taipei County (TW)

(73) Assignee: KWO GER Metal Technology, Inc., Taipei, Hsien (TW)

( * ) Notice: Subject to any disclaimer, the term of this patent is extended or adjusted under 35 U.S.C. 154(b) by 11 days.

(21) Appl. No.: 12/785,782

(22) Filed: May 24, 2010

(65) Prior Publication Data

US 2010/0315823 A1 Dec. 16, 2010

(30) Foreign Application Priority Data

Jun. 16, 2009 (TW) ............................... 98120142 A

(51) Int. Cl.
*B60Q 1/00* (2006.01)

(52) U.S. Cl. ........ 362/368; 362/294; 362/373; 362/362; 362/800

(58) Field of Classification Search .................. 362/368, 362/362, 294, 800, 373
See application file for complete search history.

(56) References Cited

U.S. PATENT DOCUMENTS

| | | | | |
|---|---|---|---|---|
| 6,552,658 | B1 * | 4/2003 | Roller et al. | 340/475 |
| 7,654,688 | B2 * | 2/2010 | Li et al. | 362/240 |
| 2007/0285926 | A1 * | 12/2007 | Maxik | 362/294 |
| 2008/0043472 | A1 * | 2/2008 | Wang | 362/294 |
| 2010/0302778 | A1 * | 12/2010 | Dabiet et al. | 362/249.02 |

* cited by examiner

*Primary Examiner* — Evan Dzierzynski
(74) *Attorney, Agent, or Firm* — Muncy, Geissler, Olds & Lowe, PLLC

(57) ABSTRACT

A light-emitting device pressure ring structure includes a mounting base for mounting, a circuit board accommodated in the mounting base and having electrode pins connectable to an external power source, a holder member insertable in the mounting base, a light-emitting unit fixedly mounted in the holder member with a bottom heat sink thereof suspending outside the holder member and tubular electrodes thereof connectable to the electrode pins of the circuit board for power input, and a pressure ring cap detachably threaded onto the mounting base to hold down the holder member and to keep the heat sink of the light-emitting unit outside the mounting base for quick dissipation of waste heat from the light-emitting devices of the light-emitting unit.

9 Claims, 7 Drawing Sheets

LIGHT-EMITTING DEVICE PRESSURE RING STRUCTURE

This application claims the priority benefit of Taiwan patent Application number 098120142, filed on Jun. 16, 2009.

BACKGROUND OF THE INVENTION

1. Field of the Invention

The present invention relates to light-emitting device mounting technology and more particularly, to a light-emitting device pressure ring structure, which keeps the light-emitting unit in positive contact with the electrode pins of a circuit board for power input and holds the heat sink of the light-emitting unit on the outside for quick dissipation of waste heat and, which facilitates maintenance and repair and seals off outside moisture.

2. Description of the Related Art

In order to slow down and eventually reverse global warming, many countries around the world are actively applying energy saving and carbon reduction action plains. These action plains may include planting trees and using power-saving electronic products. Nowadays, LED (light emitting diode) has been intensively used in lamp bulb, lamp tube, desk lamp, hand light, backlight, vehicle light and many other lighting fixtures and electronic products. However, only high-performance light-emitting devices can be used for lighting fixture. For use in a lighting fixture, light-emitting chips are bonded to a circuit board, which provides electrical power to the light-emitting chips and control their operation. Although LED has power-saving and high brightness characteristics, its life span is limited. During operation of a LED lamp, much waste heat is produced and must be quickly carried away. Accumulation of waste heat will cause the LED lamp to fail soon.

In actual practice, the use of conventional LED apparatus may encounter many problems as follows:

1. When multiple LEDs are bonded to a circuit board to constitute a LED lamp bulb or lamp tube, the maintenance work is complicated. When one LED fails, the whole lamp bulb or lamp tube may have to be thrown away and replaced by a new one. It is a waste to thrown away the whole lamp bulb or lamp tube. However, it is difficult to pick up the other normal LEDs from the failed lamp bulb or lamp tube.

2. A LED lighting fixture has multiple LEDs or light-emitting chips mounted on a circuit board that provides electrical power to the LEDs or light-emitting chips and control their operation. After installation of the LEDs or light-emitting chips in the circuit board, the LEDs or light-emitting chips are not detachable from the circuit board. When one LED or light-emitting chip failed, the circuit board becomes useless, causing waste.

3. When the LED module of a lighting fixture failed and replaced by a new one, the new LED module must be examined to assure positive transmission of power supply. Further, during operation of the LED module, waste heat may be accumulated in the lighting fixture, affecting the performance and shortening the service life.

Therefore, it is desirable to provide a measure or structure that eliminates the aforesaid problems of complicated light-emitting device installation and repair work and accumulation of waste heat.

SUMMARY OF THE INVENTION

The present invention has been accomplished under the circumstances in view. It is therefore the main object of the present invention to provide a light-emitting device pressure ring structure, which dissipates waste heat rapidly during operation, facilitates maintenance and repair, and effectively seals off outside moisture.

To achieve this and other object of the present invention, a light-emitting device pressure ring structure comprises a mounting base for mounting, a circuit board accommodated in the mounting base, a holder member insertable in the mounting base, a light-emitting unit fixedly mounted in the holder member and having tubular electrodes that are respectively press-fitted onto the electrode pins of the circuit board for positive power input upon insertion of the holder member into the mounting base, and a pressure ring cap detachably threaded onto the mounting base to hold down the holder member in the mounting base.

Further, the mounting base has a center opening. The holder member has a center opening corresponding to the center opening of the mounting base. The light-emitting unit comprises a circuit substrate carrying the tubular electrodes, a plurality of light-emitting devices mounted on the circuit substrate and a heat sink mounted on the bottom side of the circuit substrate and bonded with a cooling pad. After the pressure ring cap is fastened to the mounting base to hold down the holder member in the mounting base, the heat sink of the light-emitting unit extends through the center opening of the holder member and the center opening of the mounting base to the outside of the mounting base and attachable to an external heat dissipation structure for quick dissipation of waste heat from the light-emitting devices.

Further, when mounting the mounting base of the light-emitting device pressure ring structure on an external heat dissipation structure, a gasket ring is set in between the mounting base and the external heat sink around the heat sink of the light-emitting unit to seal off outside moisture.

Further, a connection unit is provided between the outside wall of the mounting base and the inside wall of the pressure ring cap for allowing detachable fixation of the pressure ring cap to the mounting base.

DETAILED DESCRIPTION OF THE PREFERRED EMBODIMENT

Figure 1:
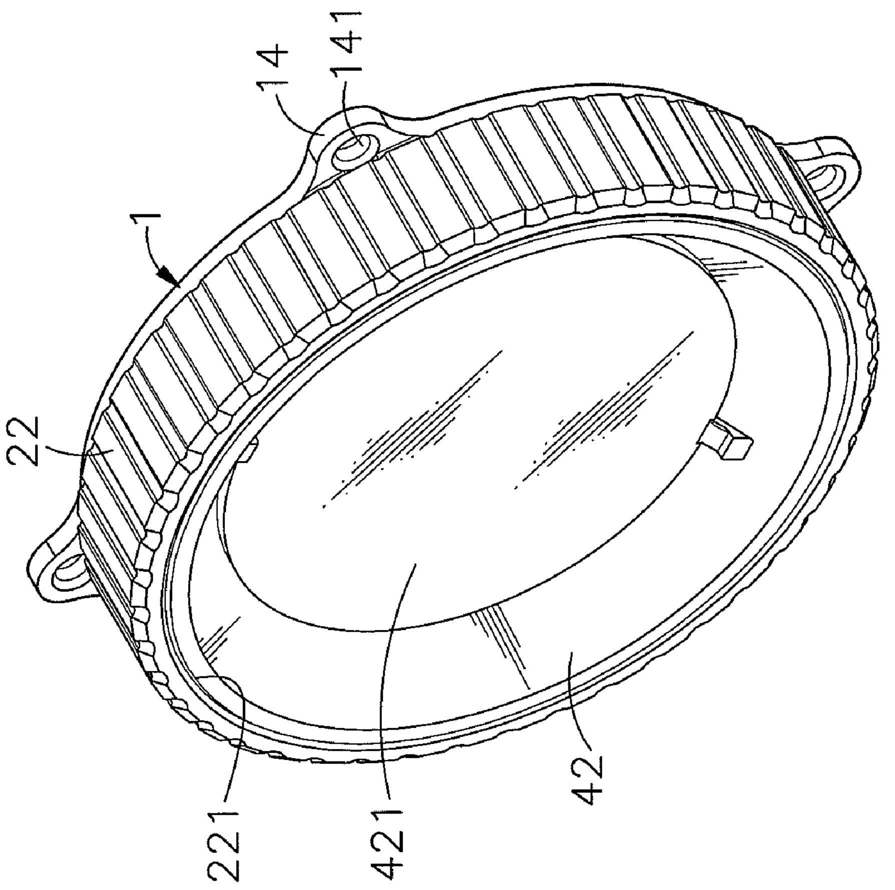
FIG. 1 is an oblique elevation of a light-emitting device pressure ring structure in accordance with the present invention.
Figure 2:
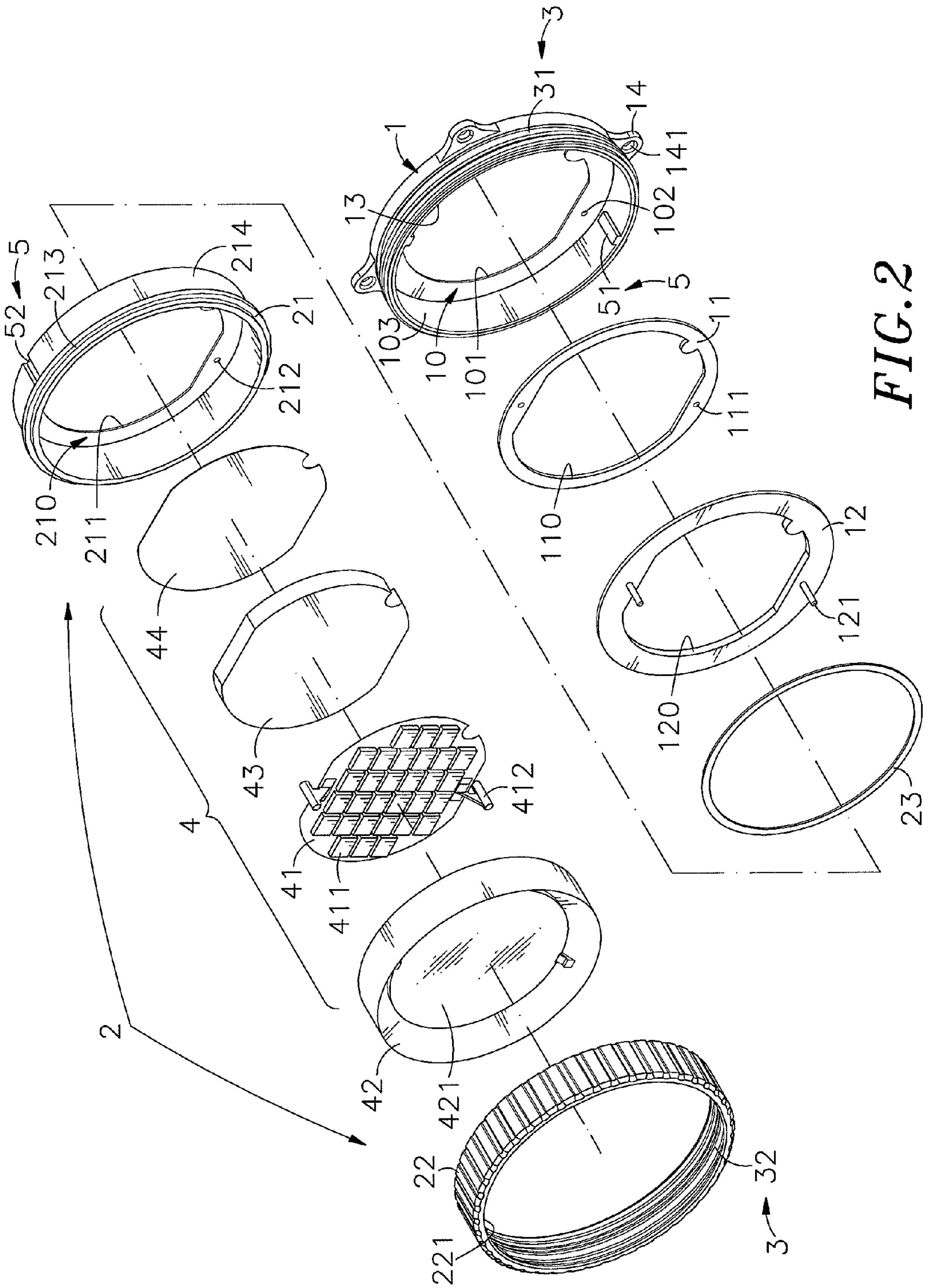
FIG. 2 is an exploded view of the light-emitting device pressure ring structure in accordance with the present invention.
Figure 3:
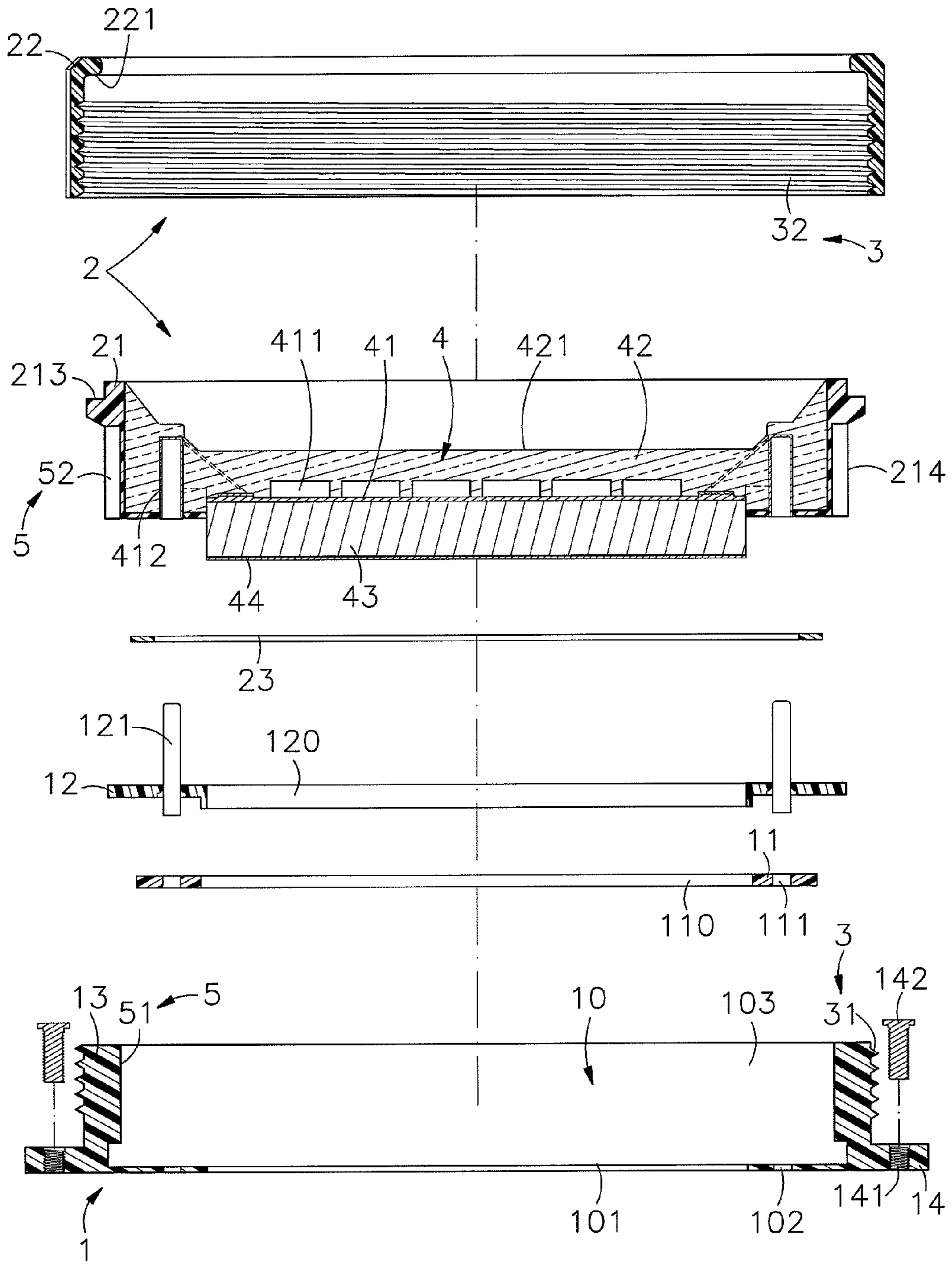
FIG. 3 is a sectional exploded view of the light-emitting device pressure ring structure in accordance with the present invention.
Figure 4:
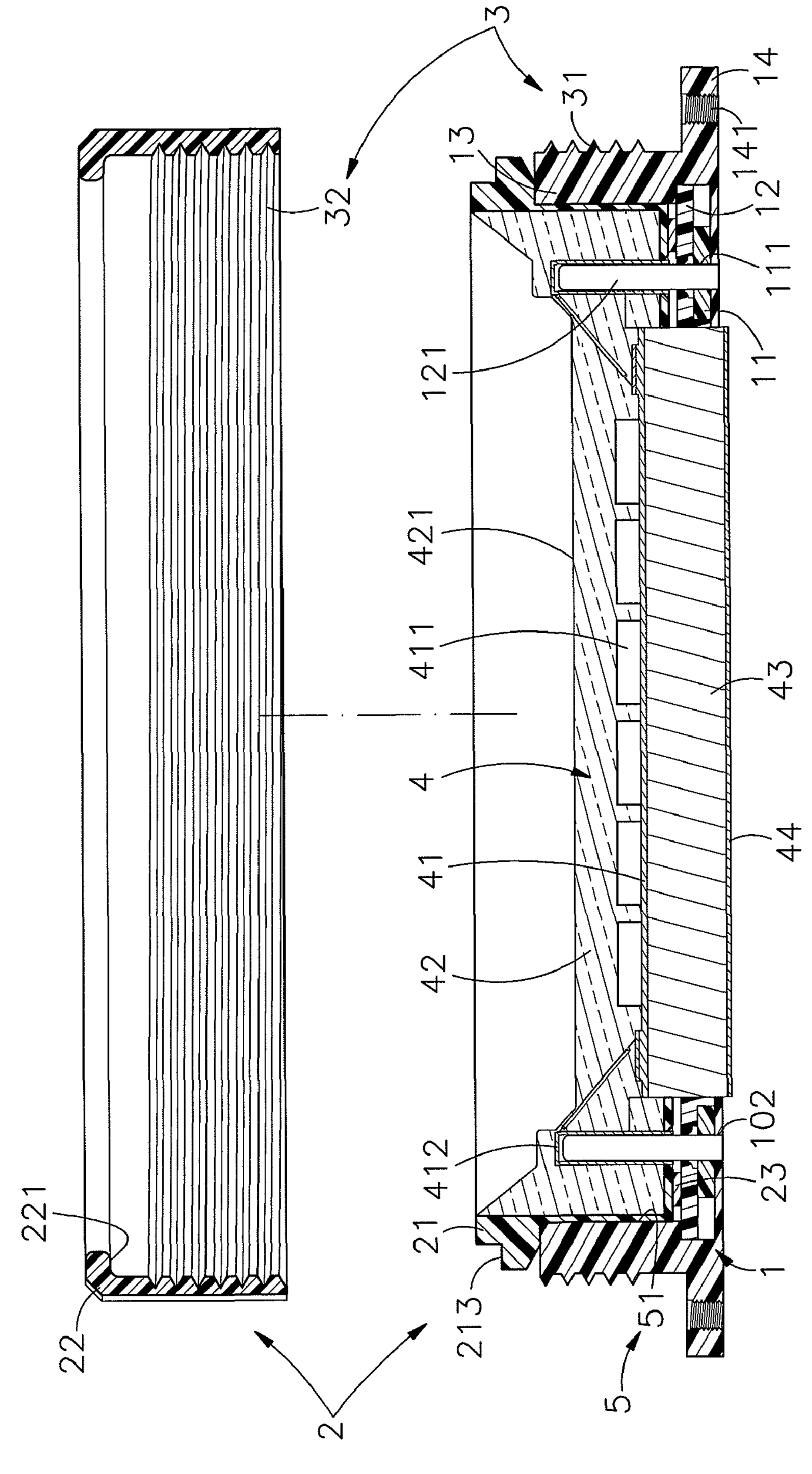
FIG. 4 is a sectional assembly view of the light-emitting device pressure ring structure in accordance with the present invention before fixation of the pressure ring cap to the mounting base.

Referring to FIGS. 1-4, a light-emitting device pressure ring structure in accordance with the present invention is shown comprising a mounting base 1, a pressure ring unit 2, a connection unit 3 and a light-emitting unit 4.

The mounting base 1 has an accommodation chamber 10 defined therein, a center opening 101 cut through the bottom wall of the accommodation chamber 10, a plurality of locating holes 102 located on the bottom wall of the accommodation chamber 10 and spaced around the center opening 101, a connection portion 13 extending around the periphery of the accommodation chamber 10 and a plurality of mounting portions, for example, mounting lugs 14 perpendicularly extended from and equiangularly spaced around the connection portion 13. Further, the mounting base 1 accommodates a spacer member 11 and a circuit board 12 in the accommodation chamber 10. The spacer member 11 is set between the bottom wall of the accommodation chamber 10 and one side of the circuit board 12, having a center opening 110 corresponding to the center opening 101 of the mounting base 1 and a plurality of through holes 111 cut through the top and bottom sides thereof corresponding o the locating holes 102 of the mounting base 1. The circuit board 12 has a center opening 120 corresponding to the opening 101 of the mounting base 1 and the center opening 110 of the spacer member 11 and a plurality of electrode pins 121 spaced around the center opening 110. The electrode pains 121 have the respective top and bottom ends thereof respectively extended out of the top and bottom walls of the circuit board 12.

The pressure ring unit 2 comprises a holder member 21, a pressure ring cap 22 and a gasket ring 23. The holder member 21 has a holding chamber 210 defined therein, a center opening 211 cut through the bottom wall of the holding chamber 210, a plurality of round holes 212 cut through the bottom wall of the holding chamber 210 and equiangularly spaced around the center opening 211, and a locating flange 213 extending around the outside wall 214 thereof. The pressure ring cap 22 is capped on the holder member 21, having an annular inside stop flange 221 stopped against the locating flange 213 of the holder member 21. The gasket ring 23 is supported on the outside of the holder member 21 around the center opening 211.

The connection unit 3 is provided between the outside wall of the connection portion 13 of the mounting base 1 and the inside wall of the pressure ring cap 22 of the pressure ring unit 2, comprising an outer thread 31 formed integral with and extending around the outside wall of the connection portion 13 of the mounting base 1 and inner thread 32 formed integral with and extending around the inside wall of the pressure ring cap 22 of the pressure ring unit 2 for threading into the outer thread 31. Any other connection structure, for example, a connection structure consisting of male retaining members and female retaining members may be used to substitute for the aforesaid screw joint type connection structure.

The light-emitting unit 4 comprises a circuit substrate 41 carrying a circuit layout, a plurality of light-emitting devices 411 arranged in an array on one side of the circuit substrate 41, a plurality of tubular electrodes 412 located on and extended out of the circuit substrate 41 and electrically connected with the light-emitting devices 411, a packing lens 42 bonded to the circuit substrate 41 over the light-emitting devices 411 and having a transmissive face 421 through which the light emitted by the light-emitting devices 411 passes, a flat heat sink 43 attached to the other side of the circuit substrate 41 for absorbing waste heat from the circuit substrate 41 and the light-emitting devices 411 and a cooling pad 44 attached to one side of the flat heat sink 43 opposite to the circuit substrate 41 for quick dissipation of waste heat.

Further, a positioning unit 5 may be provided between the inside wall 103 of the mounting base 1 and the outside wall 214 of the holder member 21 to guide positioning of the holder member 21 in the mounting base 1 and to prohibit rotation of the holder member 21 relative to the mounting base 1. According to this embodiment, the positioning unit 5 comprises a plurality of positioning ribs 51 longitudinally located on the inside wall 103 of the mounting base 1 and a plurality of positioning grooves 52 longitudinally located on the outside wall 214 of the holder member 21 for receiving the positioning ribs 51 respectively. The positioning ribs 51 can be dovetailed ribs, and the positioning grooves 52 can be dovetailed grooves for receiving the dovetailed positioning ribs 51. Alternatively, the positioning unit 5 can be a positioning structure comprising a plurality of sliding blocks and a plurality of sliding grooves matching the sliding blocks.

Further, the bottom ends of the electrode pins 121 of the circuit board 12 that is accommodated in the accommodation chamber 10 of the mounting base 1 are respectively inserted the through holes 111 of the spacer member 11 and the locating holes 102 of the mounting base 1 for connection to an external power source to obtain the necessary working electrical power.

Figure 5:
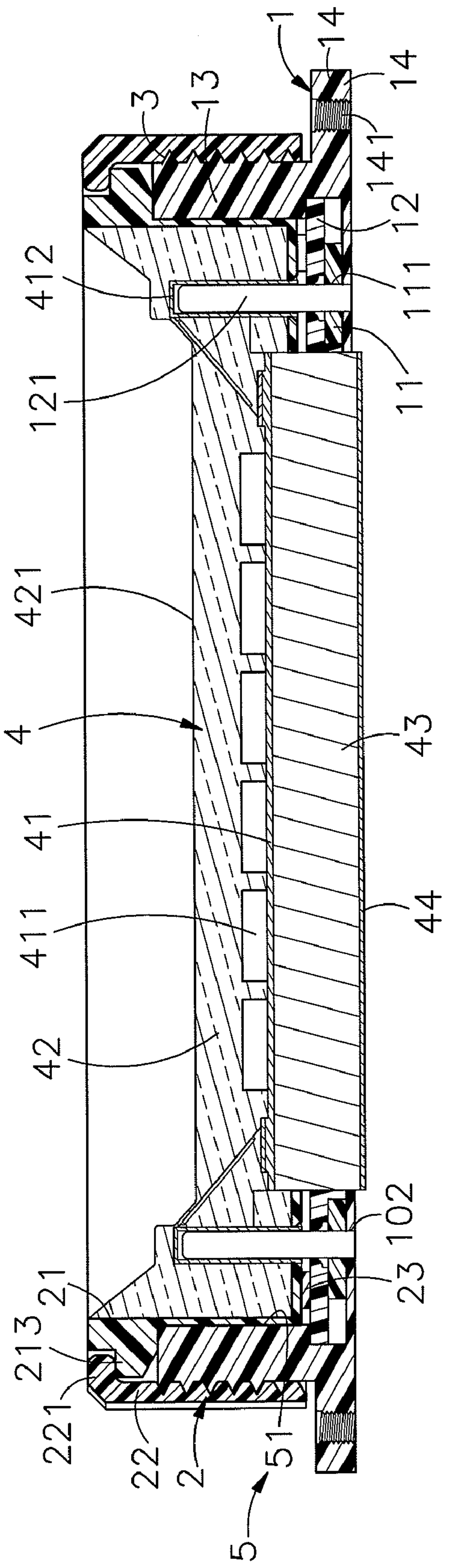
FIG. 5 is a sectional assembly view of the light-emitting device pressure ring structure in accordance with the present invention.

Referring to FIG. 5 and FIGS. 1-4 again, during installation of the light-emitting device pressure ring structure, the light-emitting unit 4 is installed in the holding chamber 210 inside the holder member 21 of the pressure ring unit 2. After installation of the light-emitting unit 4 in the holder member 21, the packing lens 42 of the light-emitting unit 4 is kept inside the holding chamber 210 and the heat sink 43 and cooling pad 44 of the light-emitting unit 4 are inserted through the center opening 211 to the outside of the holder member 21. Thereafter, the holder member 21 of the pressure ring unit 2 with the light-emitting unit 4 are inserted into the accommodation chamber 10 of the mounting base 1 to force the positioning ribs 51 into the positioning grooves 52, thereby prohibiting rotation of the holder member 21 relative to the mounting base 1. At this time, the holder member 21 is stopped against the gasket ring 23 to hold down the circuit board 12 and the spacer member 11 against the bottom wall of the mounting base 1, the top ends of the electrode pins 121 of the circuit board 12 are inserted through the round holes 212 of the holder member 21 and the tubular electrodes 412 of the circuit substrate 41 of the light-emitting unit 4 are respectively press-fitted onto the electrode pins 121 of the circuit board 12. Thus, the circuit substrate 41 of the light-emitting unit 4 and the circuit board 12 are electrically connected. At this time, the heat sink 43 and cooling pad 44 of the light-emitting unit 4 are inserted through the center opening 101 to the outside of the mounting base 1. Thereafter, the pressure ring cap 22 of the pressure ring unit 2 is capped on the mounting base 1 and rotated to thread the inner thread 32 at the pressure ring cap 22 into the outer thread 31 at the mounting base 1, forcing the stop flange 221 of the pressure ring cap 22 against the locating flange 213 of the holder member 21 and holding down the light-emitting unit 4 and the holder member 21 in the mounting base 1. Thus, electrical power can be transmitted from the external power source through the electrode pins 121 of the circuit board 12 and the tubular electrodes 421 of the circuit substrate 42 of the light-emitting unit 4 to the light-emitting devices 411, driving the light-emitting devices 411 to emit light. Further, it is to be understood that the light-emitting unit 4 may be integrally formed in the holding chamber 210 inside the holder member 21 of the pressure ring unit 2. For example, the packing lens 42 of the light-emitting unit 4 can be directly molded on the circuit substrate 41 and the inside wall of the holder member 21.

Further, the aforesaid light-emitting devices 411 can be LED lamps, high-power light-emitting diodes, light-emitting chips, or surface mount light-emitting diodes. During operation of the light-emitting devices 411, waste heat is rapidly transferred from the light-emitting devices 411 through the heat sink 43 and the cooling pad 44 and dissipated into the open air outside the Light-emitting device pressure ring structure. Further, the transmissive face 421 of the packing lens 42 can be a concave face, a convex face, or a face having any of a variety of other shapes.

Figure 6:
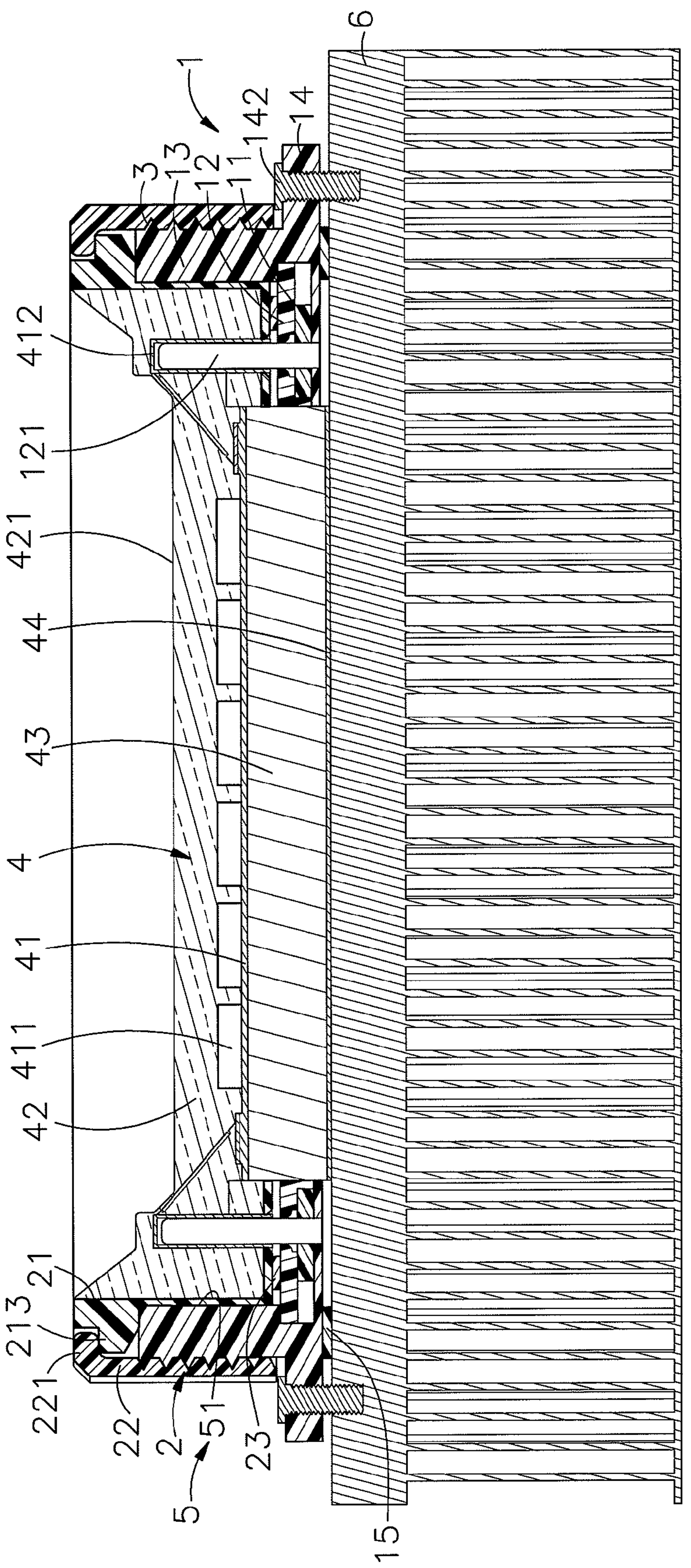
FIG. 6 is a sectional view of the present invention, showing the light-emitting device pressure ring structure fastened to an external heat sink.

Referring to FIG. 6 and FIG. 5 again, when the light-emitting device pressure ring structure is assembled, the pressure ring cap 22 is firmly secured to the mounting base 1 by the connection unit 3 to hold down the holding member 21 in the accommodation chamber 10 of the mounting base 1, and the light-emitting unit 4 is kept in the holder member 21 inside the mounting base 1 and electrically connected to the circuit board 12. Thus, the whole assembly of the light-emitting device pressure ring structure has a compact characteristic convenient for installation in a lamp bulb, lamp housing, tubular lampshade or lighting fixture for emitting light by means of the light-emitting devices 411 of the light-emitting unit 4. Further, multiple light-emitting device pressure ring structures can be used together in a lighting fixture. If one of the light-emitting units 4 of the light-emitting device pressure ring structures failed, the user can disengage the inner thread 32 of the failed light-emitting device pressure ring structure from the associating outer thread 31 and then open the pressure ring cap 22 of the failed light-emitting device pressure ring structure from the associating mounting base 1, and then take the failed light-emitting unit 4 and the associating holder member 21 out of the associating mounting base 1 for a replacement. Thereafter, the new holder member 21 with the new light-emitting unit 4 are put in the mounting base 1 to force the tubular electrodes 412 of the new light-emitting unit 4 onto the electrode contacts 121 of the circuit board 12 in the mounting base 1, and then fasten the pressure ring cap 22 to the mounting base 1 again by means of threading the inner thread 32 into the outer thread 31. Thus, the replacement work is done rapidly. Further, the light-emitting device pressure ring structure can be affixed to an external heat sink 6, keeping the cooling pad 44 in close contact with the surface of the external heat sink 6 for quick transfer of waste heat from the light-emitting devices 411 through the heat sink 43 and cooling pad 44 to the external heat sink 6 for quick dissipation. Further, before fixation of the light-emitting device pressure ring structure to the external heat sink 6, a gasket ring 15 is mounted in between the mounting base 1 and the external heat sink 6 around the heat sink 43 and the cooling pad 44 to seal off outside moisture.

Figure 7:
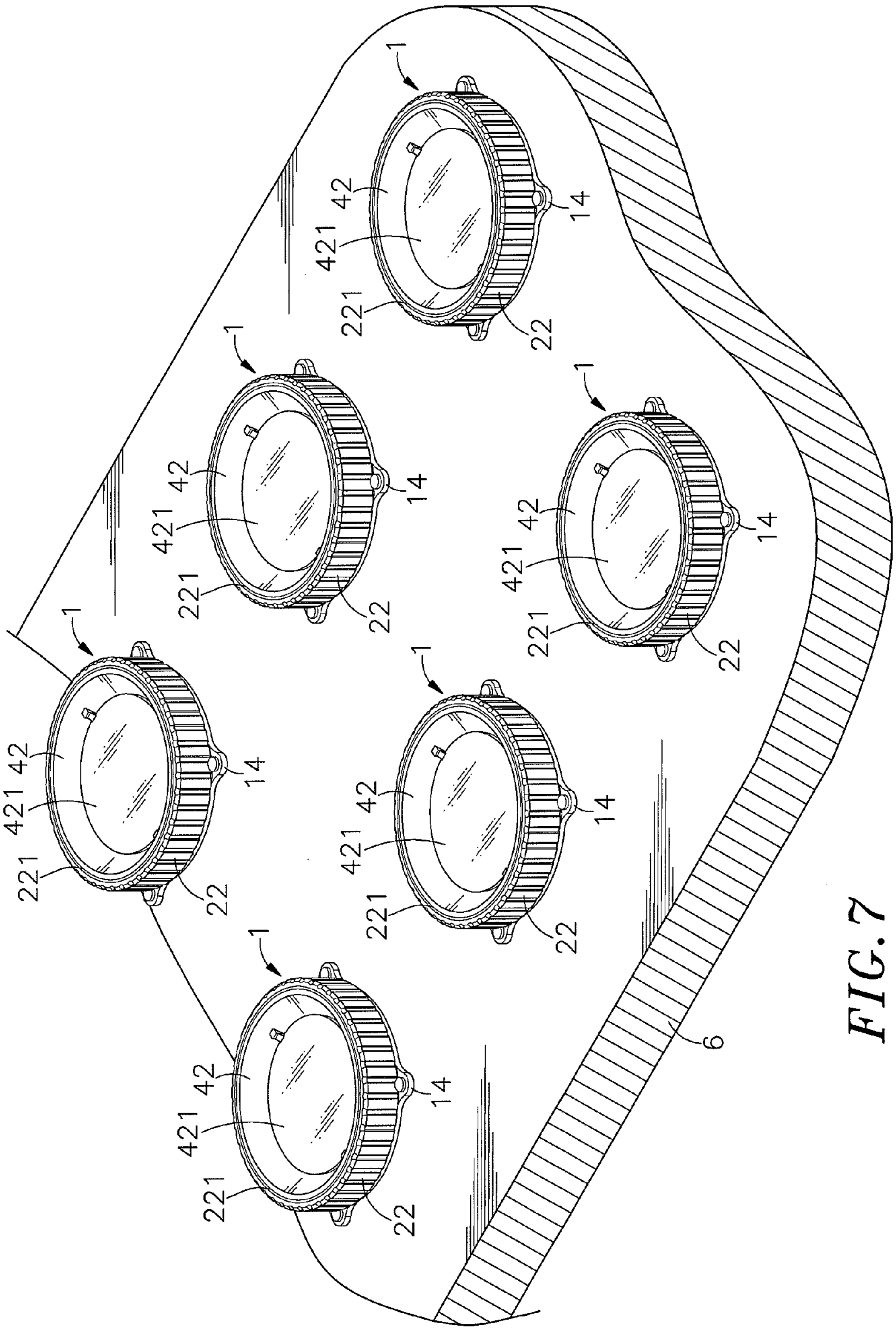
FIG. 7 is an applied view of the present invention, showing multiple light-emitting device pressure ring structures fastened to an external heat sink.

Referring to FIG. 7 and FIGS. 2 and 6 again, each mounting lug 14 of the mounting base 1 has a mounting through hole 141. Fastening members, for example, screws 142 are inserted through the mounting through holes 141 of the mounting lugs 14 of the mounting bases 1 of multiple light-emitting device pressure ring structures and driven into the external heat sink 6 to affix these multiple light-emitting device pressure ring structures to the external heat sink 6. It is to be understood that other known mounting techniques may be used to substitute for the screws 142 for affixing the mounting bases 1 of the light-emitting device pressure ring structures to the external heat sink 6. During application, waste heat is quickly transferred from the light-emitting units 4 of the light-emitting device pressure ring structures through the respective heat sinks 43 and cooling pads 44 to the external heat sink 6 for quick dissipation. Further, when one particular light-emitting unit 4 failed, the pressure ring cap 22 of the light-emitting device pressure ring structure in question can be removed from the associating mounting base 1 for quick replacement of the failed light-emitting unit 4.

As indicated above, the invention provides a light-emitting device pressure ring structure, which comprises a mounting base 1 holding a spacer member 11 and a circuit board 12 in an accommodation chamber 10 therein, a holder member 21 mounted in the accommodation chamber 10 inside the mounting base 1, a light-emitting unit 4 mounted inside the holder member 21 and having tubular electrodes 412 respectively press-fitted onto respective electrode pins 121 of the circuit board 12, and a pressure ring cap 12 threaded onto the mounting base 1 to hold down the holder member 21 and the light-emitting unit 4, for enabling the heat sink 43 and cooling pad 44 of the light-emitting unit 4 to be exposed to the outside of the mounting base 1 for dissipation of waste heat. During installation of the mounting base 1 in an external device, a gasket ring 15 is provided at the bottom side of the mounting base 1 to seal off outside moisture.

In conclusion, the invention provides a light-emitting device pressure ring structure, which has the advantages and features as follows:

1. The pressure ring cap 22 is detachably fastened to the mounting base 1 to hold down the holder member 21 and the light-emitting unit 4. When multiple light-emitting device pressure ring structures are used in a lamp, hand light or any of a variety of lighting fixtures and when the light-emitting unit 4 of one light-emitting device pressure ring structure failed, the failed light-emitting unit 4 with the associating holder member 21 can be easily and rapidly removed from the respective light-emitting device pressure ring structure for a replacement, saving much the repair time and labor.

2. When mounting the mounting base 1 of the light-emitting device pressure ring structure on an external heat sink 6, a gasket ring 15 is set in between the mounting base 1 and the external heat sink 6 around the heat sink 43 and cooling pad 44 of the light-emitting unit 4 to seal off outside moisture.

3. When the light-emitting device pressure ring structure is assembled, the pressure ring cap 22 is fastened to the mounting base 1 to hold down the holder member 21 and the light-emitting unit 4, and the heat sink 43 and cooling pad 44 of the light-emitting unit 4 are kept suspending outside the mounting base 1. After installation of the light-emitting device pressure ring structure in an external heat sink 6, the cooling pad 44 is kept in close contact with the surface of the external heat sink 6 for quick transfer of waste heat from the light-emitting devices 411 through the heat sink 43 and the cooling pad 44 to the external heat sink 6 rapidly for quick dissipation, preventing heat accumulation in the mounting base 1 and prolonging the service life of the light-emitting unit 4.

4. The mounting base 1 has multiple mounting portions, for example, mounting lugs 14 spaced around the outside wall for fixation to an external heat sink, circuit board, lamp holder or support frame by fastening members, for example, screws 142. Thus, it is easy to mount and dismount the light-emitting device pressure ring structure. When a repair or replacement work is necessary, the light-emitting device pressure ring structure can be opened directly for repairing or replacing the internal component parts without changing the external circuit board, lamp holder or lighting fixture parts.

5. When fastened up the pressure ring cap 22 to hold down the holder member 21 with the light-emitting unit 4 in the mounting base 1, the tubular electrodes 312 of the circuit substrate 41 of the light-emitting unit 4 are kept in contact with the respective electrode pins 121 of the circuit board 12 in the mounting base 1 positively, assuring stable transmission of electrical power to the light-emitting unit 4.

A prototype of light-emitting device pressure ring structure has been constructed with the features of FIGS. 1~7. The light-emitting device pressure ring structure functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A light-emitting device pressure ring structure, comprising:

a mounting base, said mounting base having an accommodation chamber defined therein and a center opening cut through a bottom wall of said accommodation chamber;

a circuit board accommodated in said accommodation chamber inside said mounting base, said circuit board having a plurality of electrode pins electrically connectable to an external power source;

a pressure ring unit, said pressure ring unit comprising a holder member mountable in said accommodation chamber inside said mounting base and defining therein a holding chamber, said holder member having a center opening corresponding to the center opening of said mounting base, and a pressure ring cap fastenable to said mounting base to hold down said holder member in said mounting base;

a connection unit provided between an outside wall of said mounting base and an inside wall of said pressure ring cap for allowing fixation of said pressure ring cap to said mounting base; and a light-emitting unit fixedly mounted in said holding chamber of said holder member of said pressure ring unit, said light-emitting unit comprising a circuit substrate, a plurality of light-emitting devices mounted on said circuit substrate, a plurality of electrodes mounted in said circuit substrate and electrically connected with said light-emitting devices and electrically connectable to said electrode pins of said circuit board upon insertion of said holder member in said accommodation chamber inside said mounting base, and a heat sink fixedly provided at a bottom side of said circuit substrate and extending out of said holder member through the center opening of said holder member for suspending outside the center opening of said mounting base after insertion of said holder member in said accommodation chamber inside said mounting base.

2. The light-emitting device pressure ring structure as claimed in claim 1, wherein said mounting base has a spacer member accommodated in the accommodation chamber thereof; said circuit board is supported on said spacer member, having a center opening corresponding to the center opening of said mounting base for the passing of said heat sink of said light-emitting unit to the outside of said mounting base.

3. The light-emitting device pressure ring structure as claimed in claim 1, wherein said mounting base has a connection portion extending around the periphery of said accommodation chamber and a plurality of mounting portions perpendicularly extended from and equiangularly spaced around said connection portion for mounting.

4. The light-emitting device pressure ring structure as claimed in claim 1, further comprising a positioning unit, said positioning unit comprising a plurality of male positioning members located on an inside wall of said mounting base and a plurality of female positioning members located on an outside wall of said holder member for receiving said male positioning members to prohibit rotation of said holder member relative to said mounting base after insertion of said holder member in said accommodation chamber inside said mounting base.

5. The light-emitting device pressure ring structure as claimed in claim 4, wherein said male positioning members of said positioning unit are positioning ribs longitudinally located on the inside wall of said mounting base and equiangularly spaced around the inside wall of said mounting base; said female positioning members of said positioning unit are positioning grooves longitudinally located on the outside wall of said holder member and equiangularly spaced around the outside wall of said holder member for receiving said positioning ribs.

6. The light-emitting device pressure ring structure as claimed in claim 1, wherein said holder member has a locating flange extending around the periphery thereof; said pressure ring cap has a stop flange located on the inside thereof for stopping against the locating flange of said holder member.

7. The light-emitting device pressure ring structure as claimed in claim 1, wherein said light-emitting unit further comprises a packing lens molded on said circuit substrate over said light emitting devices; said electrodes of said light-emitting unit are tubular electrodes mounted in said circuit substrate for press-fitting onto said electrode pins of said circuit board in said mounting base upon insertion of said holder member with said light-emitting unit into said accommodation chamber inside said mounting base.

8. The light-emitting device pressure ring structure as claimed in claim 1, wherein said light-emitting unit is formed integrally formed in said holding chamber inside said holder member of said pressure ring unit.

9. The light-emitting device pressure ring structure as claimed in claim 1, wherein said light-emitting unit further comprises a cooling pad bonded to a bottom wall of said heat sink opposite to said circuit substrate and suspending outside said holder member.

* * * * *